US007732756B2

(12) United States Patent
Lum et al.

(10) Patent No.: US 7,732,756 B2
(45) Date of Patent: *Jun. 8, 2010

(54) USER NAVIGATION DEVICE WITH A CODE WHEEL AND AN ENCODER

(75) Inventors: Chee Foo Lum, Penang (MY); Weng Fei Wong, Penang (MY); Siang Leong Foo, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 83 days.

This patent is subject to a terminal disclaimer.

(21) Appl. No.: 11/591,799

(22) Filed: Nov. 1, 2006

(65) Prior Publication Data
US 2008/0100569 A1    May 1, 2008

(51) Int. Cl.
*H01J 40/14* (2006.01)
*G09G 5/00* (2006.01)

(52) U.S. Cl. .................. 250/231.18; 345/169
(58) Field of Classification Search ........... 250/231.13–231.18; 345/156, 157, 161, 163, 345/184; 341/20–22; 400/489
See application file for complete search history.

(56) References Cited

U.S. PATENT DOCUMENTS

| | | | |
|---|---|---|---|
| 4,451,731 A | 5/1984 | Leonard | |
| 4,691,101 A | 9/1987 | Leonard | |
| 5,017,776 A * | 5/1991 | Loewen | 250/231.14 |
| 5,241,172 A | 8/1993 | Lugaresi | |
| 5,530,278 A | 6/1996 | Jedicka et al. | |
| 6,124,587 A | 9/2000 | Bidiville et al. | |
| 6,232,593 B1 * | 5/2001 | Taniguchi et al. | 250/231.13 |
| 6,400,356 B1 * | 6/2002 | Bidiville et al. | 345/163 |
| 6,538,243 B1 * | 3/2003 | Bohn et al. | 250/208.1 |
| 6,639,207 B2 * | 10/2003 | Yamamoto et al. | 250/231.14 |
| 6,998,601 B2 | 2/2006 | Chin et al. | |
| 7,084,856 B2 * | 8/2006 | Huppi | 345/163 |
| 7,309,855 B2 * | 12/2007 | Nagasaka et al. | 250/231.14 |
| 7,405,392 B2 | 7/2008 | Musha et al. | |
| 7,499,040 B2 * | 3/2009 | Zadesky et al. | 345/204 |
| 2002/0180691 A1 | 12/2002 | Wong et al. | |
| 2004/0081409 A1 * | 4/2004 | Ho | 385/92 |
| 2004/0141007 A1 * | 7/2004 | Amari et al. | 345/771 |
| 2005/0088667 A1 | 4/2005 | Yeo | |
| 2005/0133705 A1 | 6/2005 | Hare et al. | |
| 2005/0236560 A1 | 10/2005 | Ch'ng et al. | |
| 2006/0000966 A1 * | 1/2006 | Doe | 250/221 |
| 2006/0192764 A1 | 8/2006 | Siddiqui | |
| 2007/0242060 A1 * | 10/2007 | Cheah | 345/184 |
| 2008/0290261 A1 * | 11/2008 | Doe | 250/221 |

FOREIGN PATENT DOCUMENTS

KR    10-0642199    10/2006

* cited by examiner

*Primary Examiner*—Georgia Y Epps
*Assistant Examiner*—Tony Ko

(57) ABSTRACT

A user navigational apparatus. The user navigational apparatus includes a code wheel and an encoder. The code wheel is coupled to a dial. The code wheel includes a track of alternating reflective and non-reflective sections. The optical reflective encoder includes an emitter and a detector. The emitter generates a light signal incident on the track of the code wheel. The detector detects a reflected light signal. The reflected light signal corresponds to a portion of the incident light signal that is reflected off of the reflective sections of the track. The detector also generates a channel signal corresponding to the reflected light signal. Embodiments of this type of user navigational apparatus achieve reduced thickness compared to conventional implementations of jog wheels.

22 Claims, 12 Drawing Sheets

USER NAVIGATION DEVICE WITH A CODE WHEEL AND AN ENCODER

BACKGROUND OF THE INVENTION

A jog wheel is a type of device to allow a user to navigate through audio or video content. As the jog wheel is turned, the media typically shifts in a direction (e.g., fast-forward, reverse, left, right) according to which way the wheel is turned. For example, if the user turns the jog wheel clockwise, then the media typically advances. In contrast, if the user turns the jog wheel counter-clockwise, then the media typically reverses. Jog wheels also have been implemented as scroll wheels on computer mice. More recently, jog wheels also have been implemented as menu selection interfaces on devices such as personal digital assistants and music players. For example, jog wheels may be used to scroll through menu entries and to make menu selections.

The speed at which the media advances or reverses (or the menu selections scroll) typically depends on how the jog wheel is turned. How the user turns, or simulates turning, the jog wheel is a function of the type of jog wheel that is implemented. For multi-spin jog wheels, the jog wheel may be rotated endlessly, so that the speed at which the media advances or reverses usually corresponds to how fast the user rotates the jog wheel. For single-turn jog wheels, the rotational movement of the jog wheel is limited (e.g., typically limited to less than one full rotation) by fixed stops, and the speed at which the media advances or reverses usually corresponds to how far toward one side the user rotates the jog wheel.

A jog wheel also may be referred to as a jog dial, a shuttle dial, or a shuttle wheel. In some instances, the term "jog" is used to refer to slow navigational speeds, while the term "shuttle" is used to refer to fast navigational speeds. However, no distinction between "jog" and "shuttle" is made in the present description.

Conventionally, two technologies have been used to implement jog wheels. Specifically, conventional jog wheels are typically implemented using either capacitive sensing or magnetic sensing. In one conventional implementation of capacitive sensing, the jog wheel has a capacitive circuit such as one or more layers of conductive traces built into it to detect a change in capacitance due to the movement of a nearby conductive object such as a user's finger. In some instances, the capacitive jog wheel does not actually rotate, but the capacitive circuitry senses the simulated rotation by a finger, stylus, or other conductive object.

In magnetic sensing implementations, the jog wheel may be implemented with a hall effect sensor. A hall effect sensor is a transducer that generates a voltage in response to a change in the magnetic field density. Typically, the hall-effect sensor detects a magnetic field from a passing current-carrying conductor (or, alternatively, detects a changing current in a fixed conductor). By arranging the current-carrying conductor and the sensor in relative positions on and off the jog wheel, the hall effect sensor can detect the rotation of the jog wheel. If multiple hall effect sensors are used, the circuitry may be able to indicate partial rotation of the jog wheel and the rotational direction of the jog wheel.

The use of these conventional technologies may result in relatively thick jog wheels. In other words, the size of the jog wheel may be relatively big. Having a jog wheel that is large in size limits the potential use of jog wheels in some applications, especially in small handheld computer devices or other small devices. Also, the resolution of conventional jog wheels may be limited to the resolution of the capacitive traces or the number of hall effect sensors implemented in the jog wheel. In the case of capacitive jog wheels, the resolution is typically limited by the size of the conductive object, e.g., fingertip, used as the input device. In the case of hall effect jog wheels, increasing resolution by implementing several hall effect sensors is generally cost-prohibitive.

In view of this, what is needed is a jog wheel to overcome the physical size and resolution limitations of conventional jog wheels.

SUMMARY OF THE INVENTION

Embodiments of a user navigational apparatus are described. The user navigational apparatus includes a code wheel and an encoder. The code wheel is coupled to a dial. The code wheel includes a track of alternating reflective and non-reflective sections. The optical reflective encoder includes an emitter and a detector. The emitter generates a light signal incident on the track of the code wheel. The detector detects a reflected light signal. The reflected light signal corresponds to a portion of the incident light signal that is reflected off of the reflective sections of the track. The detector also generates a channel signal corresponding to the reflected light signal. Embodiments of this type of user navigational apparatus achieve reduced thickness compared to conventional implementations of jog wheels.

In some embodiments, the user navigational apparatus also includes a decoder and a microprocessor. The decoder generates a count signal corresponding to the channel signal. The microprocessor implements a user navigational operation on a controlled device in response to a movement of the dial by a user. The user navigational apparatus also may include one or more dome switches, an independent button, an illumination ring, a back plate, a circuit substrate, and a mounting bracket. Other embodiments of the user navigational apparatus are also described.

Embodiments of a method for making a user navigational apparatus are also described. In one embodiment, the method includes coupling a code wheel to a rotary dial, mounting an emitter on a circuit substrate relative to the code wheel, and mounting a detector on a circuit substrate relative to the code wheel.

The code wheel includes a track of alternating reflective and non-reflective sections. The emitter generates a light signal incident on the track of the code wheel. The detector detects a reflected light signal reflected off of the reflective sections of the track. The detector also generates a channel signal corresponding to the reflected light signal. Other embodiments of the method for making a user navigational apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
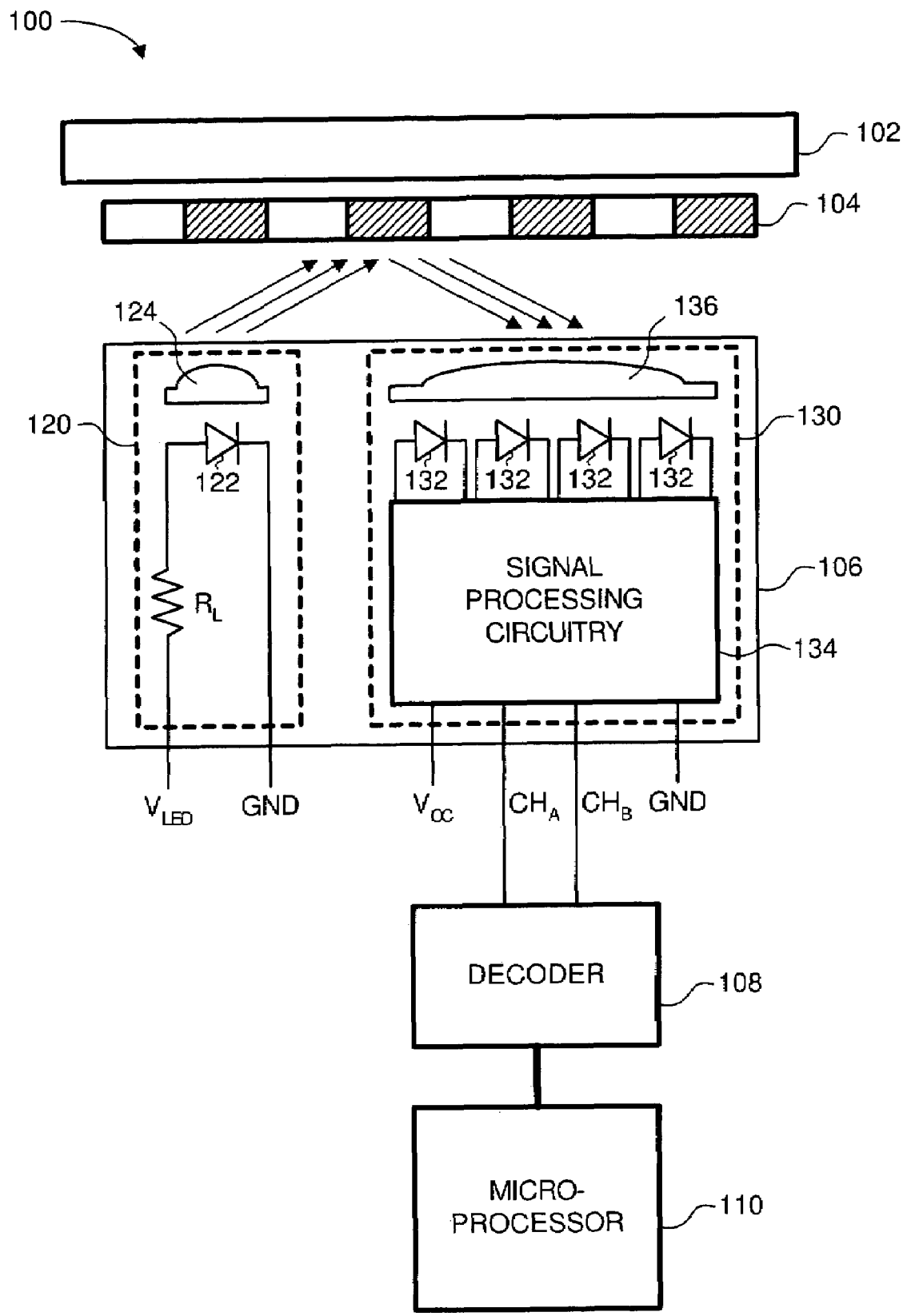
FIG. 1 depicts a schematic circuit diagram of one embodiment of an optical reflective jog wheel.

FIG. 1 depicts a schematic circuit diagram of one embodiment of an optical jog wheel 100. The illustrated optical jog wheel 100 includes a rotary dial 102, a code wheel 104, an encoder 106, a decoder 108, and a microprocessor 110. In one embodiment, the rotary dial 102 is physically coupled to the code wheel 104 and provides a tactile interface for a user to manually turn the code wheel 104. In some embodiments, the rotary dial 102 is a multiple-turn dial that may be turned endlessly. Alternatively, the rotary dial 102 may be a single-turn dial with a range of motion that is limited to approximately one revolution (i.e., 360 degrees) or less. The type of code wheel 104 implemented—multiple-turn or single-turn—corresponds to the type of rotary dial 102 that is used.

Figure 2:
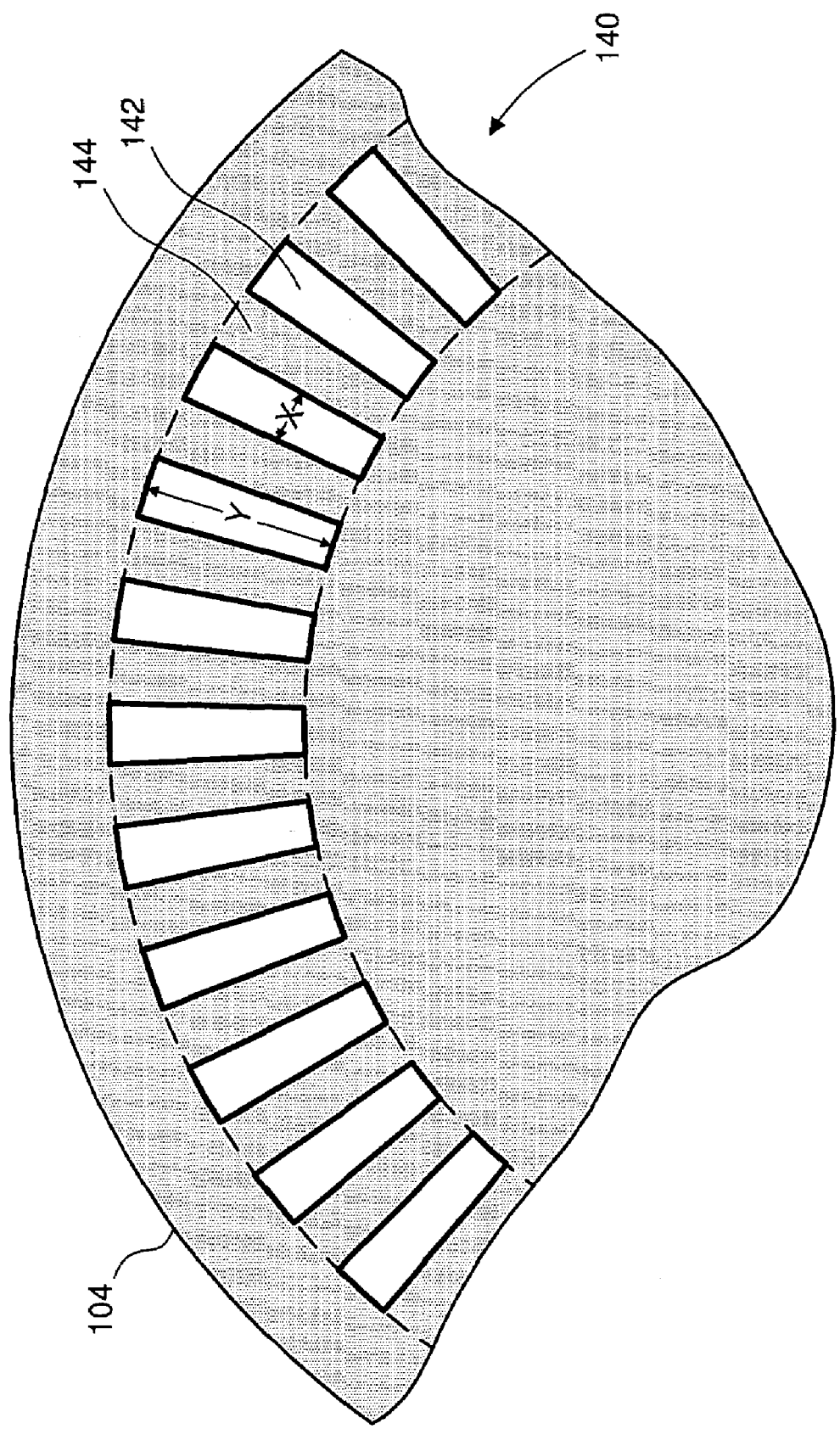
FIG. 2 depicts a partial schematic diagram of one embodiment of a code wheel.

Although a more detailed illustration of the code wheel 104 is provided in FIG. 2, a brief explanation is provided here as context for the operation of the optical jog wheel 100 shown in FIG. 1. In general, the code wheel 104 includes a track 140 of non-reflective sections 142 and reflective sections 144. An emitter 120 in the encoder 106 produces light that is incident on the code wheel track 140. As the rotary dial 102 is rotated, the incident light is reflected by the reflective sections 144 of the track 140, but is not reflected by the non-reflective sections 142 of the track 140. Thus, the light is reflected by the track 140 in a modulated pattern (i.e., on-off-on-off . . . ). A detector 130 in the encoder 106 detects the modulated, reflected light signal and, in response, generates one or more channel signals (e.g., $CH_A$ and $CH_B$). In one embodiment, these channel signals are then transmitted to the decoder 108, which generates a count signal and transmits the count signal to the microprocessor 110. The microprocessor 110 uses the count signal to implement a user navigational operation such as scrolling or menu selection corresponding to the movement of the rotary dial 102.

In one embodiment, the encoder 106 includes the emitter 120 and the detector 130. The emitter 120 includes a light source 122 such as a light-emitting diode (LED). For convenience, the light source 122 is described herein as an LED, although other light sources, or multiple light sources, may be implemented. In one embodiment, the LED 122 is driven by a driver signal, $V_{LED}$, through a current-limiting resistor, $R_L$. The details of such driver circuits are well-known. Some embodiments of the emitter 120 also may include a lens 124 aligned with the LED 122 to direct the projected light in a particular path or pattern. For example, the lens 124 may focus the light onto the code wheel track 140.

In one embodiment, the detector 130 includes one or more photodetectors 132 such as photodiodes. The photodetectors may be implemented, for example, in an integrated circuit (IC). For convenience, the photodetectors 132 are described herein as photodiodes, although other types of photodetectors may be implemented. In one embodiment, the photodiodes 132 are uniquely configured to detect a specific pattern or wavelength of reflected light. In some embodiments, several photodiodes 132 may be used to detect modulated, reflected light signals from multiple tracks 140, including positional tracks and index tracks. Also, the photodiodes 132 may be arranged in a pattern that corresponds to the radius and design of the code wheel 104.

The signals produced by the photodiodes 132 are processed by signal processing circuitry 134 which generates the channel signals, $CH_A$ and $CH_B$. In one embodiment, the detector 130 also includes one or more comparators (not shown) to facilitate generation of the channel signals. For example, analog signals (and their complements) from the photodiodes 132 may be converted by the comparators to transistor-transistor logic (TTL) compatible, digital output signals. In one embodiment, these output channel signals may indicate count and direction information for the modulated, reflected light signal. Additionally, the detector 130 may include a lens 136 to direct the reflected light signal toward the photodiodes 132.

Additional details of emitters, detectors, and optical encoders, generally, may be referenced in U.S. Pat. Nos. 4,451,731, 4,691,101, 5,017,776, and 5,241,172, which are incorporated by reference herein.

FIG. 2 depicts a partial schematic diagram of one embodiment of a code wheel 104. In particular, FIG. 2 illustrates a portion of a circular code wheel 104 in the shape of a disc. In some embodiments, the code wheel 104 may be in the shape of a ring, rather than a disc. The illustrated code wheel 104 includes a track 140, which may be a circular track that is concentric with the code wheel 104. In one embodiment, the track 140 includes a continuous repeating pattern that goes all the way around the code wheel 104. The depicted pattern includes alternating non-reflective sections 142 and reflective sections 144, although other patterns may be implemented. In one embodiment, the non-reflective sections 142 are transparent sections of the code wheel 104 or, alternatively, are voids (e.g., holes) in the code wheel 104. The reflective sections 144 are, for example, opaque sections in the code wheel 104. In one embodiment, the surface areas corresponding to the reflective sections 144 are coated with a reflective material.

Figure 16:
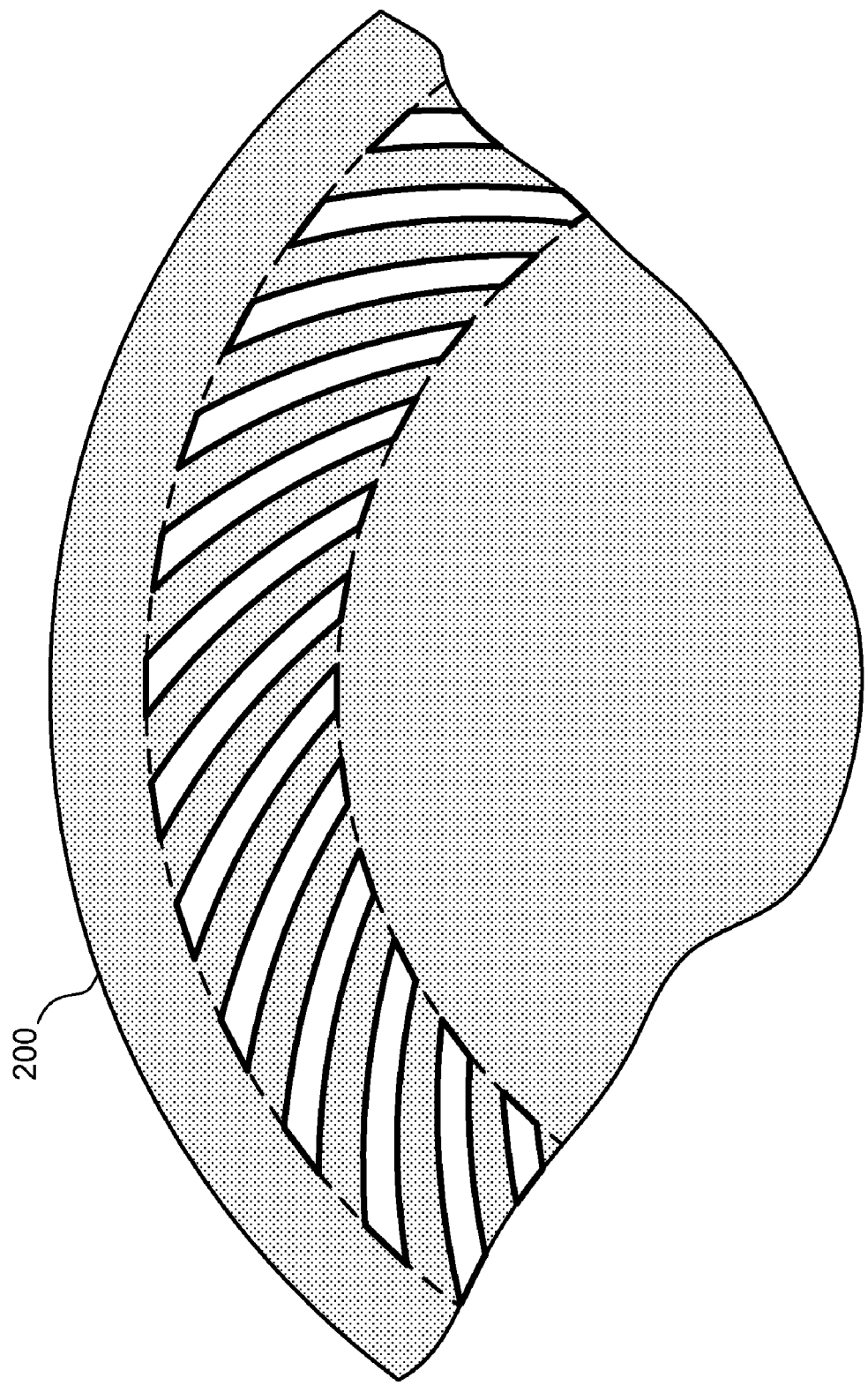
FIG. 16 depicts a partial schematic diagram of another embodiment of a code wheel with a spiral bar pattern.

Also, it should be noted that, in some embodiments, the circular code wheel 104 could be replaced with a coding element that is not circular. For example, a linear coding element such as a code strip may be used, in which case a linear slider (not shown) may be implemented instead of the rotary dial 102. In another embodiment, referring to FIG. 16, a circular coding element 200 may be implemented with a spiral bar pattern, as described in U.S. Pat. No. 5,017,776.

Alternatively, other light modulation patterns may be implemented on various shapes of coding elements.

As described above, rotation of the code wheel 104 and, hence, the track 140 results in modulation of the reflected light signal at the detector 130 to measure positional changes of the code wheel 104 and the dial 102. Other embodiments of the code wheel 104 may include other tracks such as additional positional tracks or an index track, as are known in the art.

In the depicted embodiment, the track sections 142 and 144 have the same circumferential dimensions (also referred to as the width dimension). The resolution of the code wheel 104 is a function of the width dimensions (as indicated by the span "x") of the track sections 140 and 142. The radial, or height, dimensions (as indicated by the span "y") of the track sections 140 and 142 are a function of the amount of area required to generate a sufficient amount of photocurrent (e.g., the more photocurrent that is required, the larger the area required and hence the larger "y" needs to be since area equals "x" times "y"). Additionally, the radial dimensions of the track sections 140 and 142 may be a function of the amount of area required to produce a detectable gap between consecutive, reflected light pulses.

In another embodiment, the code wheel 104 may be at least partially integrated with the dial 102, rather than being a separate component coupled to the dial 102. For example, the underside of the dial 102 may be coated with reflective material such as bright nickel (Ni) or chrome, and a non-reflective track pattern can be applied to the reflective material. The non-reflective pattern may be silk-screened, stamped, ink jet printed, or otherwise applied directly onto the reflective surface on the dial 102. Alternatively, the non-reflective pattern may be formed as a separate part such as by injection molding, die-cutting, punching (e.g., film), or otherwise forming a non-reflective component which has opaque spokes on it. Whether the non-reflective material is applied directly to the reflective material or formed as a separate component, the combined reflective and non-reflective materials function similar to the code wheel 104 described above, having alternative reflective and non-reflective sections 142 and 144. In another embodiment, the reflective and non-reflective materials may be reversed so that the underside of the dial 102 is used for the non-reflective material and a separate reflective material is applied to or formed separately from the non-reflective material.

Figure 3:
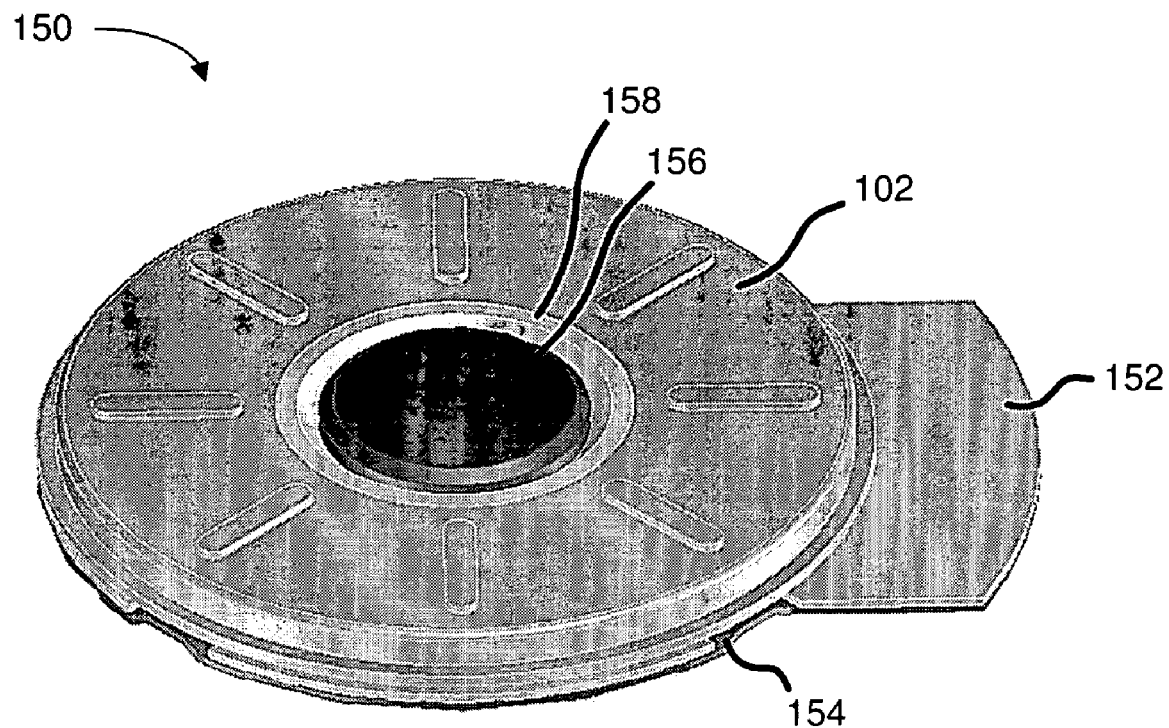
FIG. 3 depicts a perspective view of one embodiment of an optical jog wheel.
Figure 4:
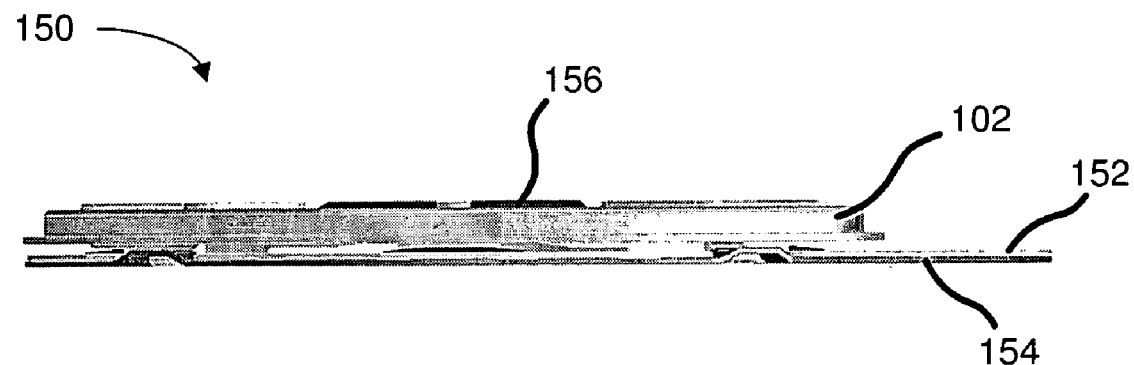
FIG. 4 depicts a side view of the optical jog wheel of FIG. 3.

FIG. 3 depicts a perspective view of one embodiment of an optical jog wheel 150. The illustrated optical jog wheel 150 includes a rotary dial 102, a code wheel 104 (not shown in FIG. 3), a circuit substrate 152, and a back plate 154. FIG. 4 depicts a side view of the optical jog wheel 150 of FIG. 3.

In one embodiment, the rotary dial 102 includes a tactile surface to facilitate rotation of the rotary dial 102 by a user. For example, the rotary dial 102 may include raised or dimpled portions, a rough surface, a tacky surface, or another tactile surface to make it relatively easy for a user's finger to engage the surface of the rotary dial 102. As described above, the code wheel 104 is coupled to the rotary dial 102 so that the rotation of the rotary dial 102 results in a corresponding rotation of the code wheel 104.

In one embodiment, the circuit substrate 152 is used to mount the encoder 106, including the emitter 120 and the detector 130. Some exemplary types of circuit substrates 152 include, but are not limited to, printed circuit board (PCB), flexible circuit, leadframe, insert molded leadframe, glass substrate, ceramic substrate, molded interconnect device (MID), and so forth. Alternatively, other types of circuit substrates 152 may be implemented. In some embodiments, other circuitry also may be mounted on the circuit substrate 152. However, in some embodiments, the amount of circuitry mounted to the circuit substrate 152 under the rotary dial 102 may be limited to keep the thickness of the optical jog wheel 150 small. The circuit substrate 152 is mounted to the back plate 154. Alternatively, the circuit substrate 152 also may be used as the back plate, in some embodiments, so that a separate back plate 154 may be omitted.

The illustrated optical jog wheel 150 also includes an independent button 154 and an illumination ring 156, although some embodiments may omit the independent button 156, or the illumination ring 158, or both. The independent button 156 may be implemented with a dome switch (not shown) or another well-known type of actuator. Alternatively, the independent button 156 may be implemented using an optical sensor which generates a button click signal in response to depression of the independent button. In a similar manner, some embodiments implement the encoder 106 to detect one or more button click operations corresponding to a depression of at least a portion of the rotary dial 102. In an embodiment, depression of the independent button or the rotary dial corresponds to a directional selection or to an item selection.

In one embodiment, the illumination ring 158 illuminates upon user interaction with the optical jog wheel 150, including rotation of the rotary dial 102, depression of the rotary dial 102, or depression of the independent button 156. The illumination ring 158 also may be used to engage with the back plate 154 to secure the other components of the optical jog wheel 150 such as the code wheel 104, rotary dial 102, and independent button 156 to the back plate 154. In some embodiments, the illumination ring 158 may function as a mounting ring, as described, without having illumination functionality.

Figure 5:
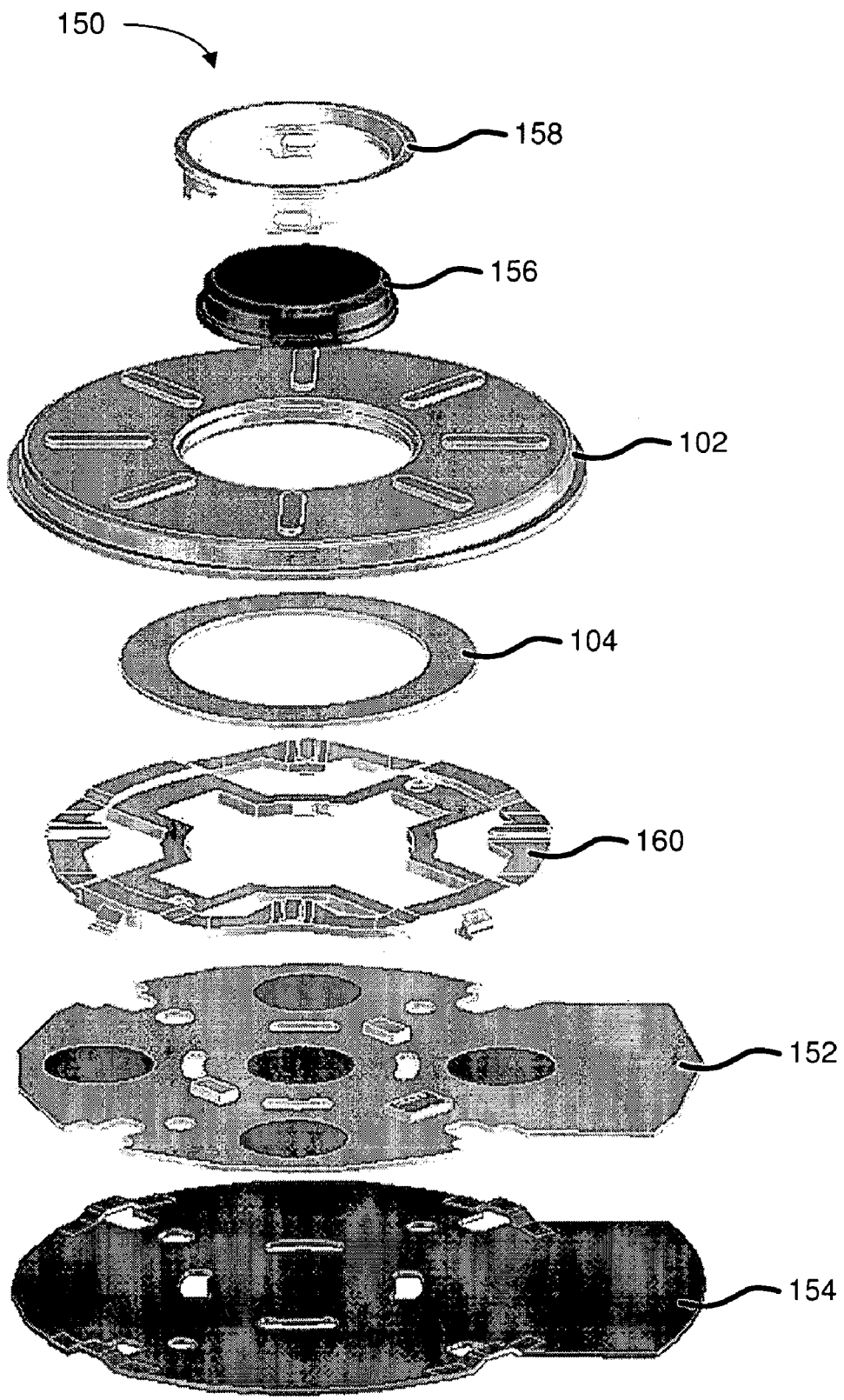
FIG. 5 depicts an exploded perspective view of the optical jog wheel of FIG. 3.

FIG. 5 depicts an exploded perspective view of the optical jog wheel 150 of FIG. 3. As described above, the optical jog wheel 150 includes a back plate 154, a circuit substrate 152, a code wheel 104, a rotary dial 102, an independent button 156, and an illumination ring 158. In contrast to the code wheel 102 of FIG. 2, the code wheel 102 shown in FIG. 5 is embodied in a ring implementation, rather than a disc implementation, although different shapes may be used.

In one embodiment, the optical jog wheel 150 also includes a mounting bracket 160. The mounting bracket 160 may function to secure the circuit substrate 152 to the back plate 154. The mounting bracket also may provide a predetermined mounting location for the code wheel 104. In one embodiment, the illumination ring 158 includes an upper flange and one or more lower fasteners such as plastic tabs to secure the several components between the illumination ring 158 and the base plate 154. For example, the lower fasteners may be inserted through holes in the circuit substrate 152 and into fastener openings in the base plate 152, at which point the lower fasteners of the illumination ring 158 may engage with the base plate 152.

Figure 6:
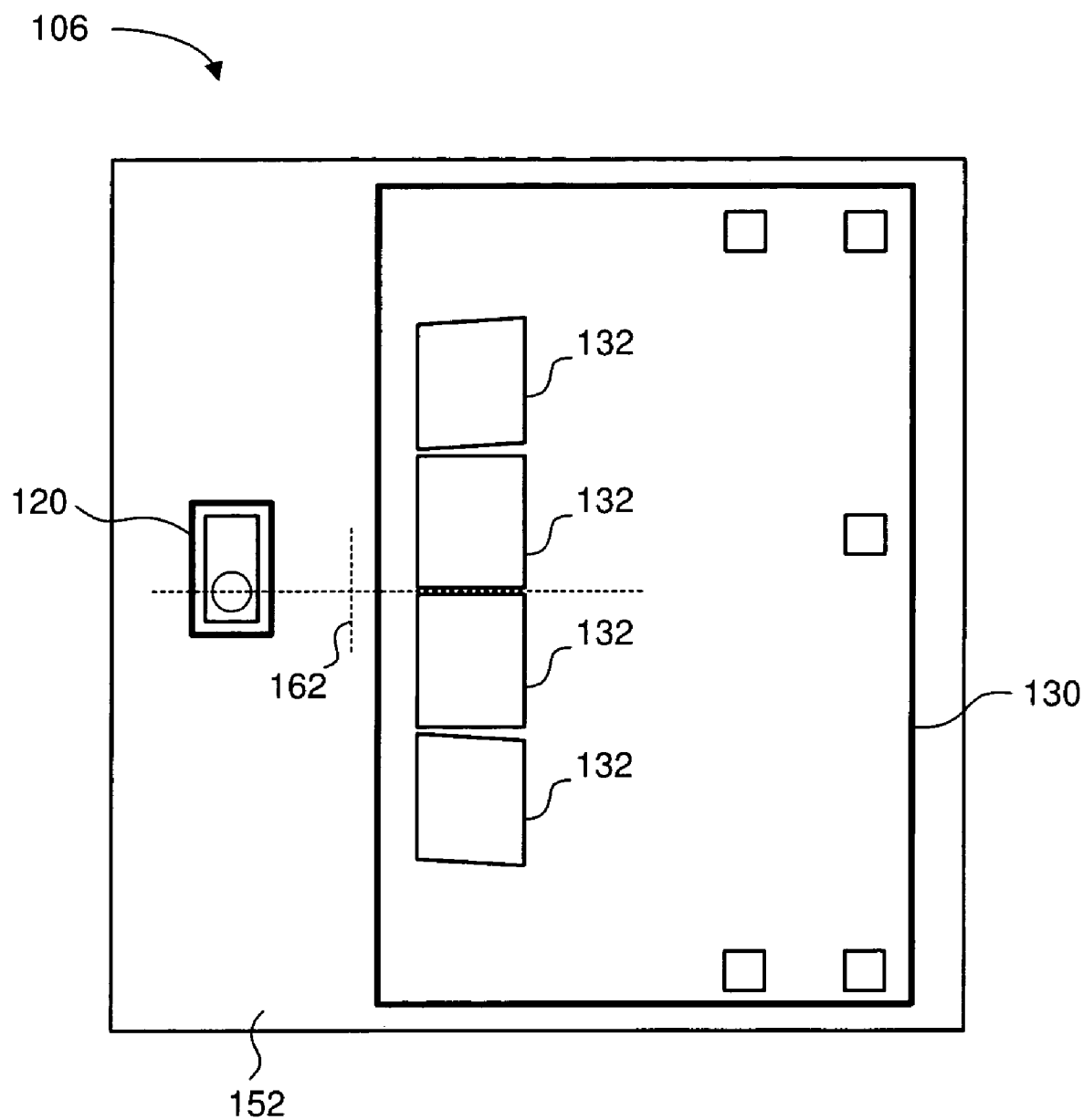
FIG. 6 depicts one embodiment of a layout of an encoder on a circuit substrate.

FIG. 6 depicts one embodiment of a layout of an encoder 106 on a circuit substrate 152. The illustrated encoder 106 includes an emitter 120 and a detector 130. The detector 130 includes four photodiodes 132 arranged relative to the emitter 120, although fewer or more photodiodes 132 may be used. In one embodiment, the photodiodes 132 are arranged so that light is incident on and reflected from the code wheel 104 approximately at a centerline 162 between the LED 122 of the emitter 120 and the photodiodes 132 of the detector 130.

Various methods may be used to implement the emitter 120 and detector 130. In one embodiment, the emitter 120 and detector 130 may be implemented using chip-on-board technology. Alternatively, the emitter 120 and detector 130 may be implemented as a discrete transfer molded emitter-detector package. In one embodiment, the emitter 120 and decoder 130 may be attached as bare dice onto the circuit substrate 152 to achieve a particular thickness of the optical jog wheel 150. In this way, the emitter 120 and detector 130 may be die-attached close together to reduce or minimize the potential loss of light power. Additionally, the mounting of the emitter 120 and detector 130 may enable a small gap between the encoder 106 and the code wheel 104. The gap between the encoder 106 and the code wheel 104 also may depend on the use of an encapsulant, if any, to encapsulate part or all of the encoder 106.

Figure 7:
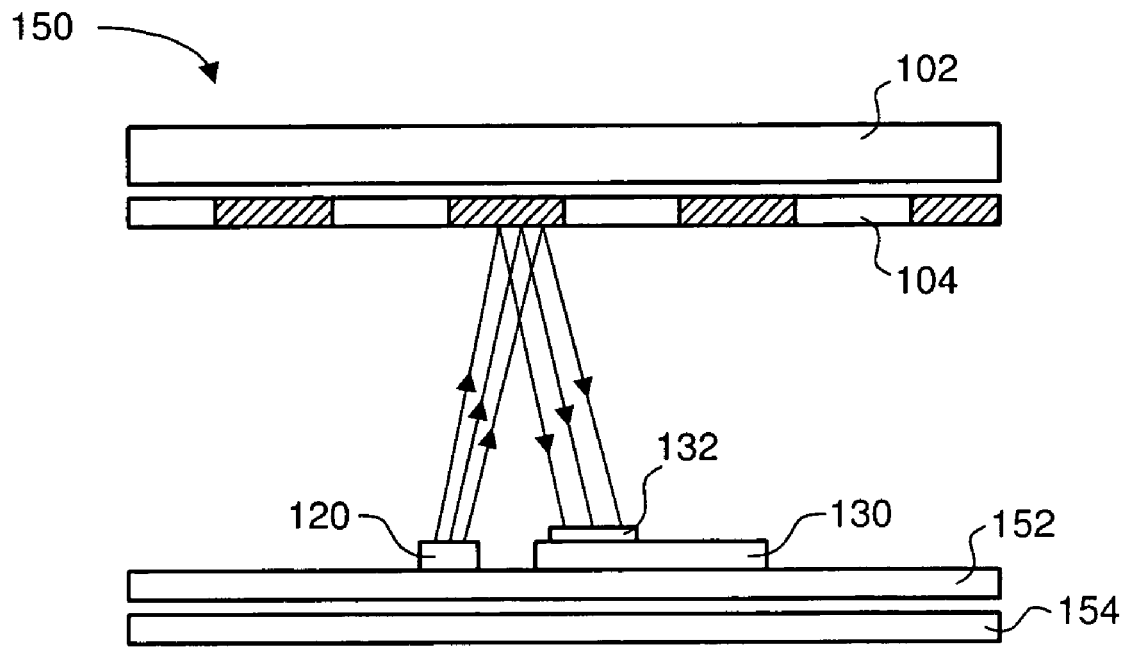
FIG. 7 depicts a side view of one embodiment of a layout of an encoder with an air gap between the encoder and the code wheel.

FIG. 7 depicts a side view of one embodiment of a layout of an encoder 106 with an air gap between the encoder 106 and the code wheel 104. In particular, the encoder 106 is not encapsulated by an encapsulant. More specifically, the emitter 120 and the decoder 130, including the photodiodes 132, are not encapsulated, so the distance between the encoder 106 and the code wheel 104 may be reduced or minimized. Since the code wheel 104 is coupled to the rotary dial 102, and the encoder 106 is coupled to the circuit substrate 152, the overall thickness of the optical jog wheel 150 may be reduced by reducing the distance between the encoder 106 and the code wheel 104.

Figure 8:
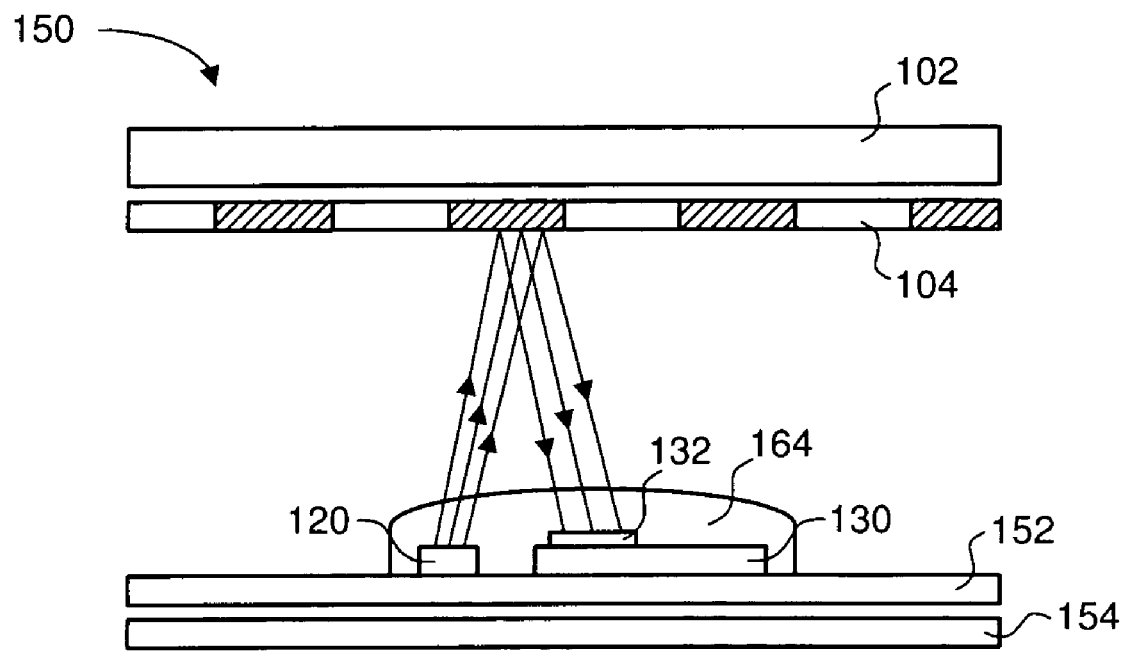
FIG. 8 depicts a side view of one embodiment of a layout of an encoder with a fully encapsulated encoder.

FIG. 8 depicts a side view of one embodiment of a layout of an encoder 106 with a fully encapsulated encoder 106. In particular, the emitter 120 and detector 130, including the photodiodes 132, are encapsulated by a single encapsulant 164. In some embodiments, using a single encapsulant may result in an increased distance between the encoder 106 and the code wheel 104 because of the resulting height of the encapsulant 164. However, in some embodiments, the encapsulant may be formed using techniques to reduce the thickness of the encapsulant 164.

Figure 9:
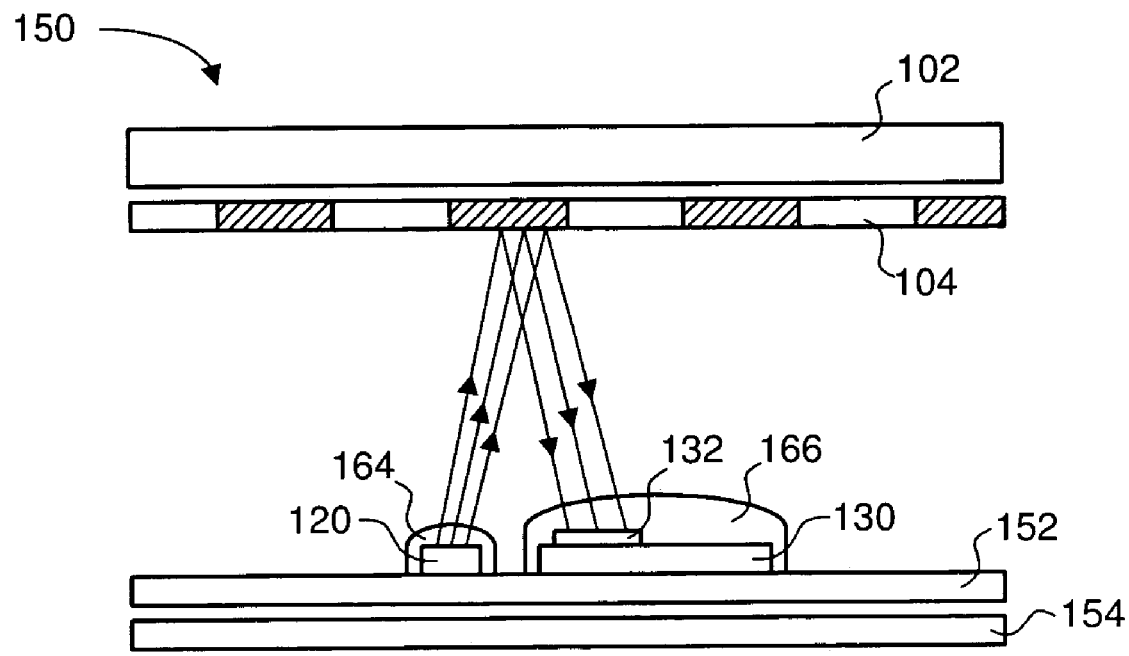
FIG. 9 depicts a side view of one embodiment of a layout of an encoder with an individually encapsulated emitter and detector.

FIG. 9 depicts a side view of one embodiment of a layout of an encoder 106 with an individually encapsulated emitter 120 and detector 130. In particular, the emitter 120 is encapsulated by a first encapsulant 164, and the detector 130 is encapsulated by a separate encapsulant 166 that is distinct from the first encapsulant 164. In some embodiments, the first and second encapsulants 164 and 166 may be the same material, although different encapsulating materials may be used.

Figure 10:
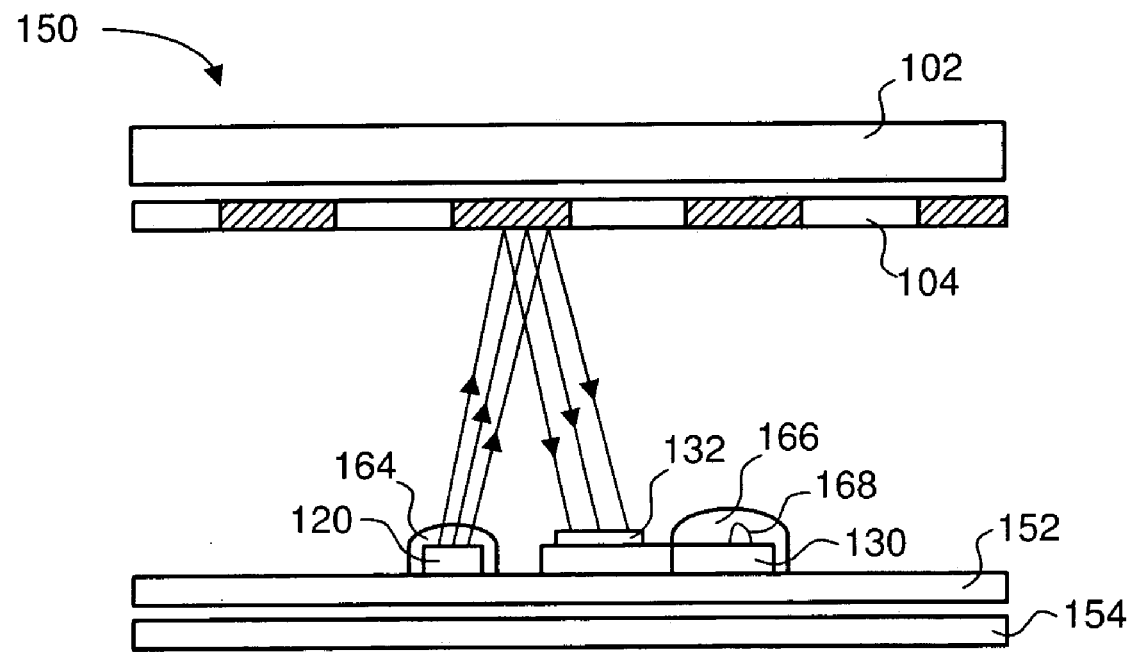
FIG. 10 depicts a side view of one embodiment of a layout of an encoder with an individually encapsulated emitter and a partially encapsulated detector.

FIG. 10 depicts a side view of one embodiment of a layout of an encoder 106 with an individually encapsulated emitter 120 and a partially encapsulated detector 130. In particular, the emitter 120 is encapsulated by a first encapsulant 164, and a portion of the detector 130 is encapsulated by a second encapsulant 166. In one embodiment, the second encapsulant 166 encapsulates a wire bond 168 of the detector 130, but does not encapsulate the photodiodes 132. In other words, one or more of the photodiodes 132 remains exposed.

Figure 11:
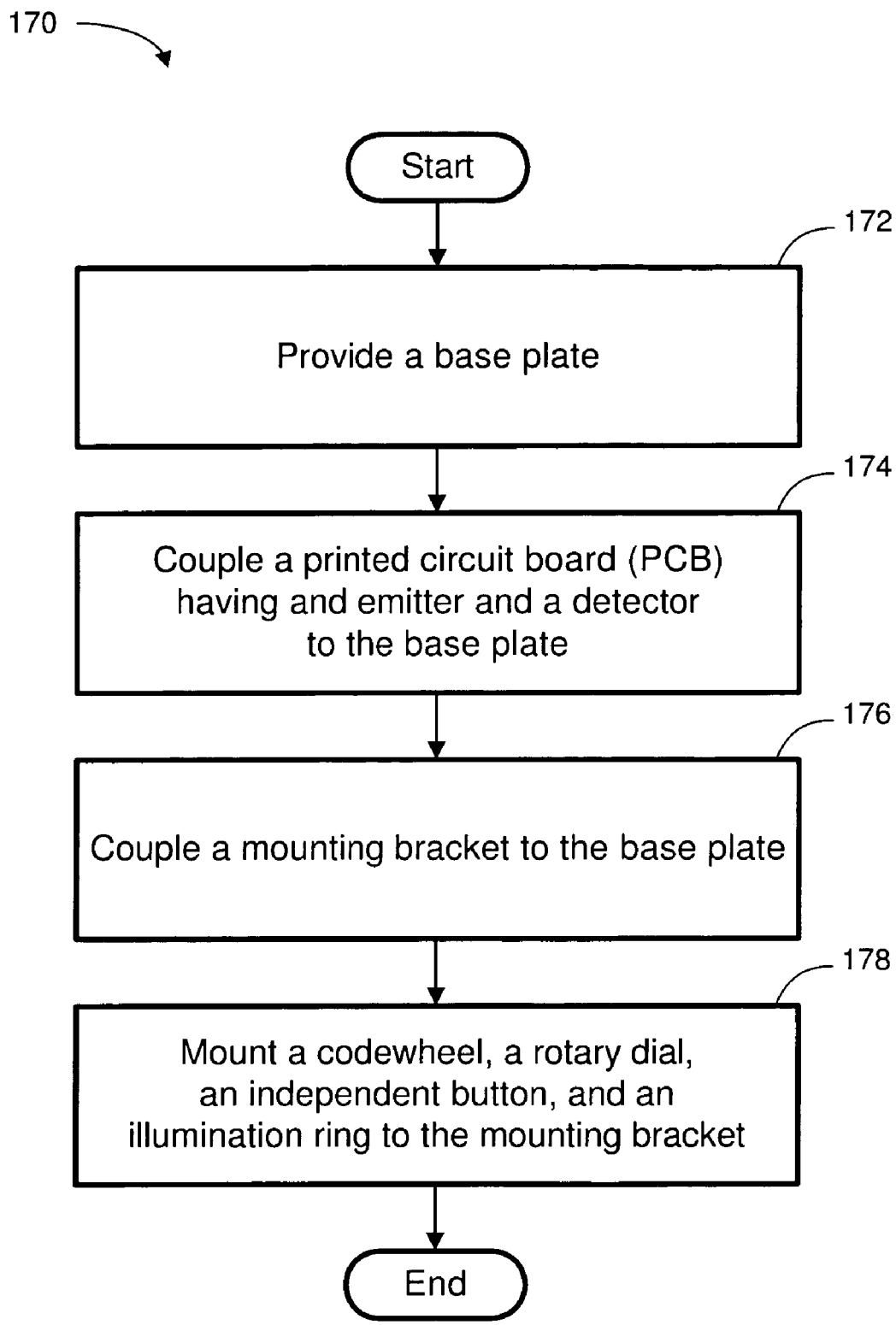
FIG. 11 depicts one embodiment of a method of making an optical jog wheel.

FIG. 11 depicts one embodiment of a method 170 of making an optical jog wheel 150. While the method 170 depicts several operations, other embodiments of the method 170 may include fewer or more operations for making an optical jog wheel 150 or similar optical navigational device.

At block 172, a base plate 154 is provided. At block 174, a circuit substrate 152 is provided and coupled to the base plate 154. In one embodiment, the circuit substrate 152 has an encoder 106, including an emitter 120 and detector 130, as described above. At block 176, a mounting bracket 160 is coupled to the base plate 154. Various types of conventional fasteners or coupling technologies may be used to couple the mounting bracket 160 to the base plate 154. At block 178, a code wheel 104, a rotary dial 102, an independent button 156, and an illumination ring 158 are mounted to the mounting bracket 160. Alternatively, the code wheel 104, rotary dial 102, independent button 156, and illumination ring 158 may be mounted to the base plate 154, as described above.

Figure 12:
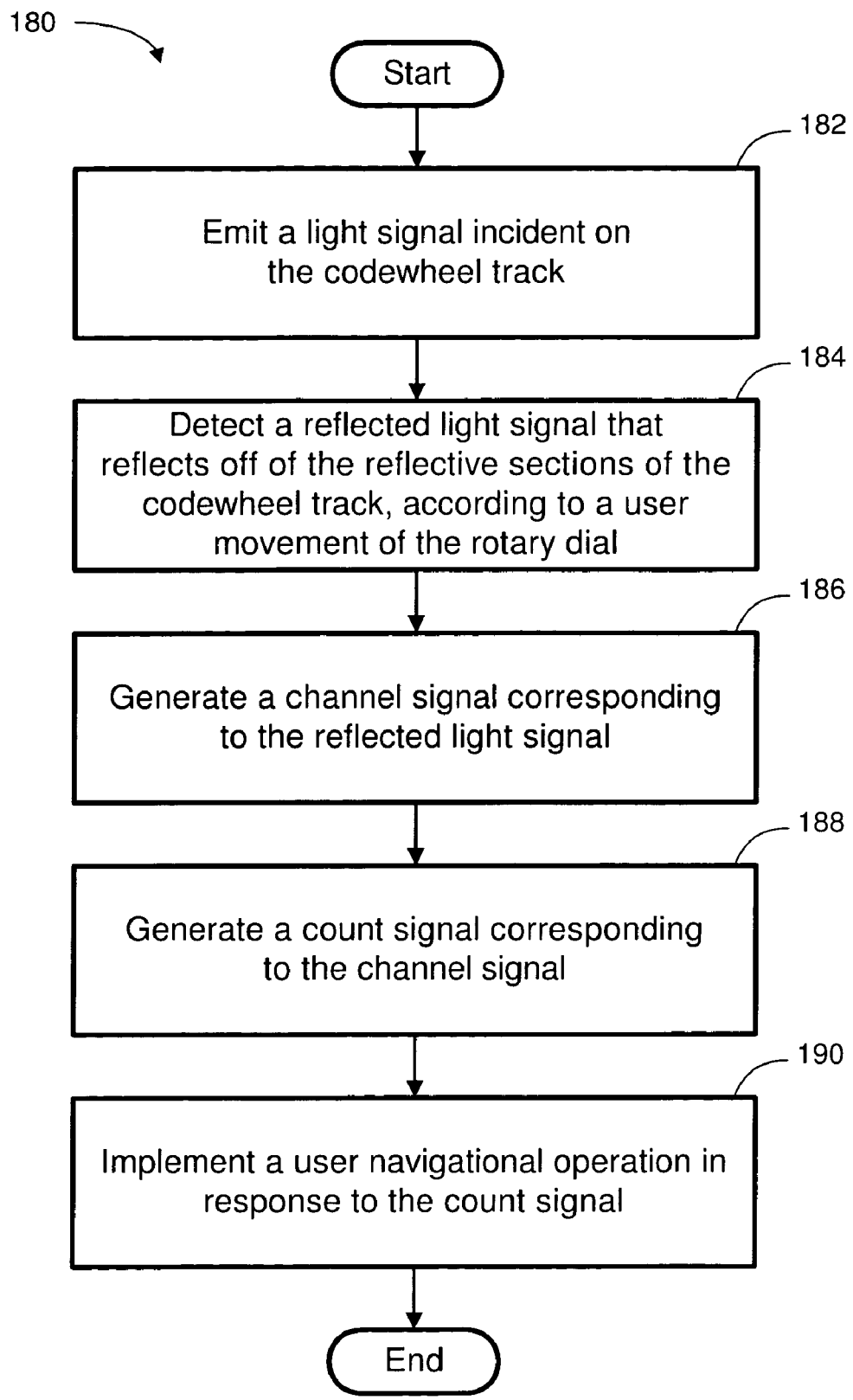
FIG. 12 depicts one embodiment of a method of using an optical jog wheel.

FIG. 12 depicts one embodiment of a method 180 of using an optical jog wheel 150. However, it should be noted that this method 180 is exemplary and other operations not discussed in conjunction with this method 180 may be implemented by one or more embodiments of an optical jog wheel 150 or similar optical navigational device.

At block 182, the emitter 120 emits a light signal incident on the track 140 of the code wheel 104. At block 184, the incident light signal reflects off of the reflective sections 144 of the track 140, and the reflected light signal is detected by the detector 130. In one embodiment, the reflected light signal is modulated according to the resolution and rotational speed of the code wheel 104. As explained above, the rotational speed of the code wheel 104 is the same as, or otherwise related to, the rotational speed of the rotary dial 102 because the code wheel 104 is coupled to the rotary dial 102.

At block 186, the detector 130 generates one or more channel signals corresponding to the modulated, reflected light signal. At block 188, the decoder 108 generates a count signal corresponding to the channel signal(s) from the detector 130. At block 190, the microprocessor 110 implements a user navigational operation in response to the count signal from the decoder 108. In this way, the microprocessor 110 implements a user navigational operation in response to a user navigational input using the rotary dial 102. The user navigational operation may be a scrolling operation, a selection operation, or another type of navigational operation on an electronic device.

Figure 13:
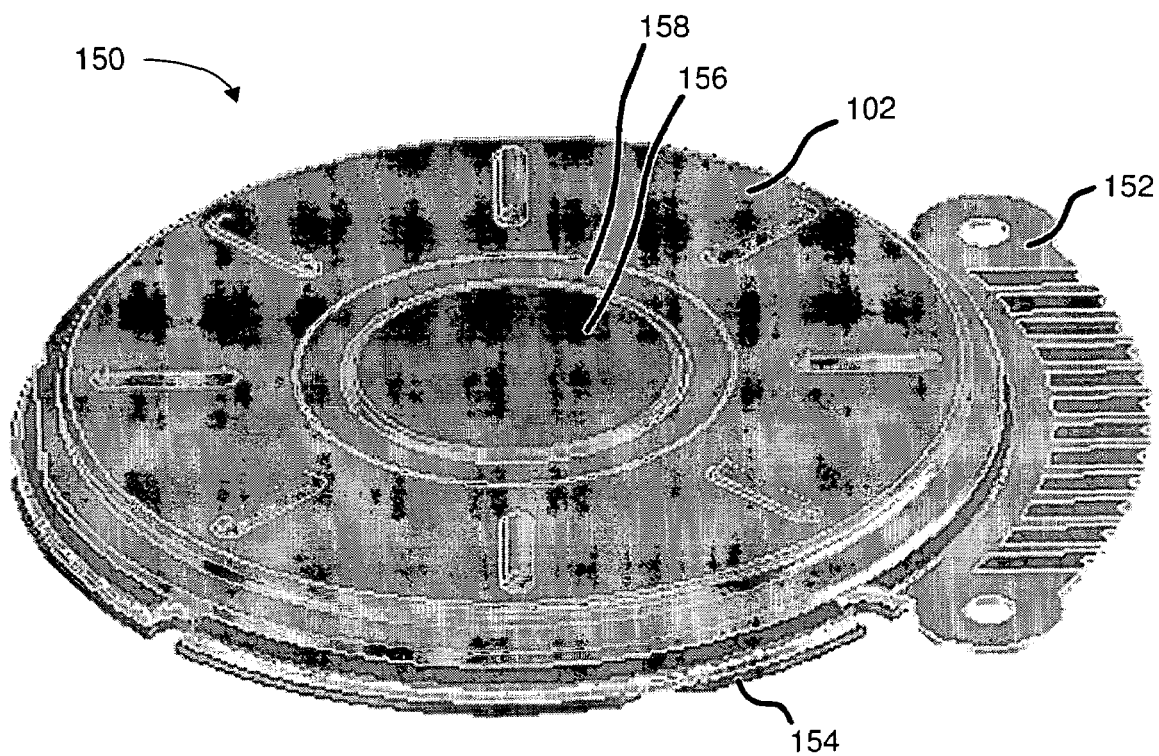
FIG. 13 depicts a perspective view of another embodiment of an optical jog wheel.
Figure 14:
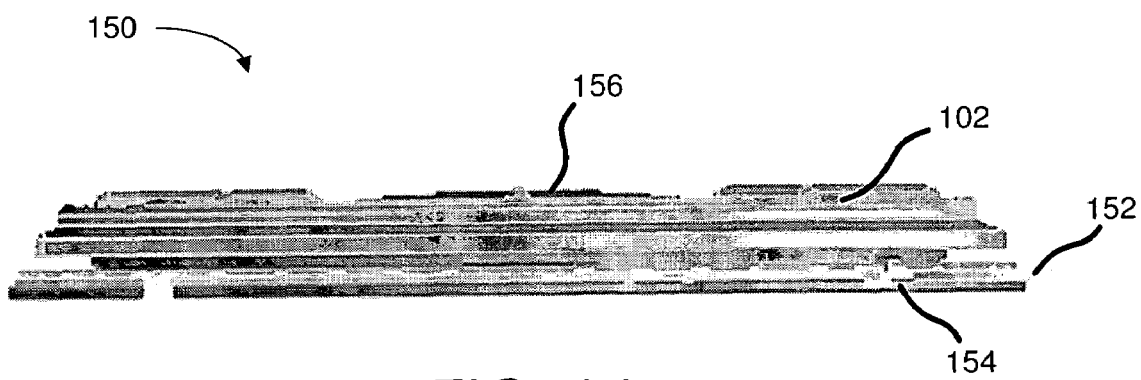
FIG. 14 depicts a side view of the optical jog wheel of FIG. 13.

FIG. 13 depicts a perspective view of another embodiment of an optical jog wheel 150. The illustrated optical jog wheel 150 includes a rotary dial 102, a code wheel 104 (not shown in FIG. 3), a circuit substrate 152, and a back plate 154. FIG. 14 depicts a side view of the optical jog wheel 150 of FIG. 13.

Figure 15:
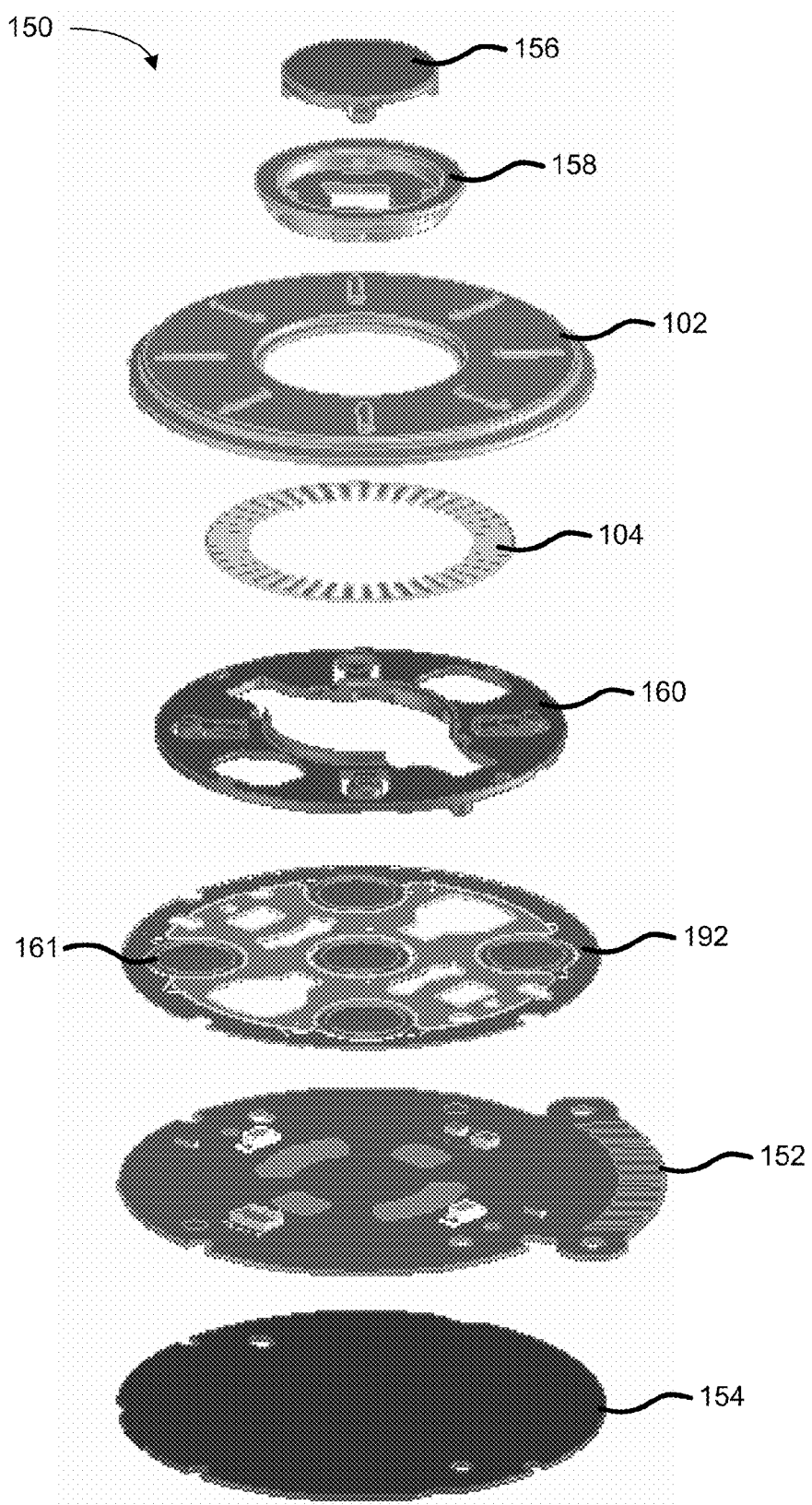
FIG. 15 depicts an exploded perspective view of the optical jog wheel of FIG. 13.

FIG. 15 depicts an exploded perspective view of the optical jog wheel 150 of FIG. 13. As described above, the optical jog wheel 150 includes a back plate 154, a circuit substrate 152, a mounting ring 160, a code wheel 104, a rotary dial 102, an independent button 156, and an illumination ring 158. In contrast to the optical jog wheel 150 of FIG. 5, the optical jog wheel 150 of FIG. 15 reverses the order of the independent button 156 and the illumination ring 158. In some embodiments, the order of the various components may be rearranged to accommodate different mounting and securing combinations.

In one embodiment, the optical jog wheel 150 of FIG. 15 also includes a metal dome array 192. The metal dome array 192 includes one or more metal dome switches 161 to allow the rotary dial 102 to be used to make selections. In one embodiment, a metal dome switch may be activated when the rotary dial 102 is depressed at approximately the location of a corresponding metal dome switch. For example, a user may activate a metal dome switch by tilting, or depressing, a portion of the rotary dial 102 near the metal dome switch. The movement of the rotary dial 102 toward the metal dome switch may engage and activate the metal dome switch. Various arrangements for the metal dome array 192 may be implemented. As described above, the metal dome array 192 may be used in conjunction with the rotary dial 102 to allow a user to make a selection or implement a user navigational operation.

In another embodiment, the encoder also may include components for determining absolute position. For example, the encoder may include additional tracks, photodetectors, LEDs, or other components to allow the encoder to determine an absolute angular position of the code wheel upon power up. The absolute angular position can be determined using many known techniques. One exemplary technique, with corresponding hardware, is described in more detail in U.S. patent Ser. No. 11/445,661, filed on Jun. 2, 2006, entitled "Multi-bit absolute position optical encoder with reduced number of tracks," which is incorporated by reference herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A user navigational apparatus comprising:
    a dial;
    a code wheel coupled to the dial, wherein the code wheel comprises a track of alternating reflective and non-reflective sections located within a plane of the code wheel;
    an encoder comprising an emitter and a detector, the emitter configured to generate a light signal incident on the track of the code wheel, the detector configured to detect a reflected light signal reflected off of the reflective sections of the track and to generate a channel signal corresponding to the reflected light signal;
    a switch coupled to the dial, the switch to generate a first button click operation in response to depression of only a portion of the dial;
    a dome switch operationally coupled to an independent button; and
    an illumination ring approximately surrounding the independent button, wherein the dial circumscribes the illumination ring and the independent button.

2. The user navigational apparatus of claim 1 further comprising:
    a decoder coupled to the encoder, the decoder to generate a count signal corresponding to the channel signal; and
    a microprocessor coupled to the decoder, the microprocessor to implement a user navigational operation on a controlled device in response to a movement of the dial by a user.

3. The user navigational apparatus of claim 2 wherein:
    the independent button is coupled to the microprocessor, wherein the microprocessor is configured to implement a second button click operation;
    wherein the user navigational operation comprises a scrolling operation corresponding to a turn of the dial, the first button click operation corresponding to the depression of only the portion of the dial, or a second button click operation corresponding to a depression of the independent button; and
    wherein the scrolling operation manipulates content on the controlled device.

4. The user navigational apparatus of claim 3 wherein the microprocessor is further configured to generate a signal to implement a directional selection or an item selection on the controlled device in response to the depression of the dial or the depression of the independent button.

5. The user navigational apparatus of claim 1 further comprising:
    a back plate;
    a circuit substrate coupled to the back plate, wherein the encoder is coupled to the circuit substrate; and
    a mounting bracket coupled to the back plate, wherein the code wheel, the dial, the independent button, and the illumination ring are mounted to the mounting bracket.

6. The user navigational apparatus of claim 1 wherein the detector comprises:
    a photodiode to detect the reflected light signal reflected off of the reflective sections of the track; and
    signal processing circuitry coupled to the photodiode, the signal processing circuitry to generate the channel signal corresponding to the reflected light signal.

7. The user navigational apparatus of claim 6 further comprising an air gap between the code wheel and the emitter and between the code wheel and the detector, wherein the emitter and the detector are not encapsulated by an encapsulant.

8. The user navigational apparatus of claim 6 further comprising an encapsulant to jointly encapsulate the emitter and the detector.

9. The user navigational apparatus of claim 6 further comprising:
    a first encapsulant to encapsulate the emitter; and
    a second encapsulant to encapsulate the detector.

10. The user navigational apparatus of claim 6 further comprising:
    a first encapsulant to encapsulate the emitter; and
    a second encapsulant to encapsulate a wire bond of the detector, wherein the second encapsulant does not encapsulate the photodiode.

11. The user navigational apparatus of claim 1 wherein the encoder comprises an incremental, multi-turn, multi-channel, rotary encoder.

12. The user navigational apparatus of claim 1 wherein the encoder comprises a chip-on-board emitter and detector or a discrete transfer molded emitter-detector package.

13. The user navigational apparatus of claim 1 further comprising a switch coupled to the dial, the switch to generate a first button click operation in response to depression of only a portion of the dial.

14. The user navigational apparatus of claim 1 wherein the code wheel is a flat ring.

15. The user navigational apparatus of claim 1 wherein the track of alternating reflective and non-reflective sections is arranged in a spiral bar pattern.

16. A user navigational apparatus comprising:
    a rotary dial;
    a dome switch operationally coupled to an independent button;
    an illumination ring approximately surrounding the independent button, wherein the rotary dial circumscribes the illumination ring and the independent button;
    means for generating a light signal incident on a coded track, wherein the coded track comprises alternating reflective and non-reflective sections located within a plane of the code wheel; and
    means for detecting motion of the coded track, wherein the coded track is configured to move in response to a user movement of the rotary dial, wherein the user movement comprises depressing only a portion of the rotary dial to activate a first button clicking operation.

17. The user navigational apparatus of claim 16 further comprising means for implementing a user navigational operation on a controlled device in response to the user movement of the rotary dial.

18. The user navigational apparatus of claim 16 further comprising means for encapsulating at least a portion of an encoder mounted in conjunction with the coded track.

19. The user navigational apparatus of claim 16 further comprising means for activating a switch in response to the detected motion of the coded track or a detected motion of the independent button.

20. A method for making a user navigational apparatus, the method comprising:
   coupling a code wheel to a rotary dial, wherein the code wheel comprises a track of alternating reflective and non-reflective sections located within a plane of the code wheel;
   mounting an emitter on a circuit substrate relative to the code wheel, the emitter to generate a light signal incident on the track of the code wheel;
   mounting a detector on the circuit substrate relative to the code wheel, the detector to detect a reflected light signal reflected off of the reflective sections of the track and to generate a channel signal corresponding to the reflected light signal;
   mounting a dome switch operationally coupled to an independent button; and
   mounting an illumination ring approximately surrounding the independent button, wherein the rotary dial circumscribes the illumination ring and the independent button.

21. The method of claim 20 further comprising:
   coupling the detector to a decoder to generate a count signal corresponding to the channel signal; and
   coupling the decoder to a microprocessor to implement a user navigational operation on a controlled device in response to a movement of the rotary dial by a user.

22. The method of claim 20 further comprising encapsulating at least a portion of an encoder mounted in conjunction with the coded track.

* * * * *